United States Patent [19]
Kamiyama et al.

[11] Patent Number: 5,846,025
[45] Date of Patent: Dec. 8, 1998

[54] APPARATUS AND A METHOD FOR LINING AN UNDERGROUND PIPE

[75] Inventors: Takao Kamiyama, Hiratsuka; Yasuhiro Yokoshima; Shigeru Endoh, both of Ibaraki-ken; Hiroyuki Aoki, Tokorozawa, all of Japan

[73] Assignees: Shonan Gosei-jushi Seisakusho KK, Kanagawa-ken; Yokoshima & Company; GET Inc., both of Ibaraki-ken; OAR Company, Saitama-ken, all of Japan

[21] Appl. No.: 767,617

[22] Filed: Dec. 17, 1996

[30] Foreign Application Priority Data

Mar. 19, 1996 [JP] Japan .................................. 8-062497

[51] Int. Cl.⁶ .................................................. F16L 55/18
[52] U.S. Cl. .......................... 405/154; 138/97; 156/287; 156/293
[58] Field of Search .................................. 405/154, 184, 405/156, 303; 138/97; 156/287, 294

[56] References Cited

U.S. PATENT DOCUMENTS

| | | | |
|---|---|---|---|
| 5,520,484 | 5/1996 | Kamiyama et al. | 405/154 |
| 5,653,555 | 8/1997 | Catallo | 405/154 |
| 5,706,861 | 1/1998 | Wood et al. | 405/154 X |
| 5,725,328 | 3/1998 | Schmager | 405/154 X |

*Primary Examiner*—Tamara L. Graysay
*Assistant Examiner*—Tara L. Mayo
*Attorney, Agent, or Firm*—Whithan, Curtis & Whithan

[57] ABSTRACT

An apparatus and a method for lining an underground pipe are proposed: the pipe is plugged at a location upstream to a manhole; a three-pronged passage is installed whose first end penetrates the plug and opens in the interior of the pipe upstream to the plug and whose second end opens in the manhole at the level of the pipe, and whose third end opens in the atmosphere at a substantially high level; then the second end of the three-pronged passage is closed to cause the drain water to rise and go toward the third end of the three-pronged passage; the drain water is let to fall from the down-looking third end of the three-pronged passage into an upper end of a vertical eversion conduit provided in the manhole, thereby effecting eversion of a tubular liner into the vertical eversion conduit means; the tubular liner everting in the vertical eversion conduit is guided by a guide device such that at the lower end of the vertical eversion conduit the eversion head of the tubular liner is caused to turn orthogonally into the downstream direction; and the tubular liner is constricted at a location downstream to the repair portion of the pipe so that the tubular liner is inflated.

16 Claims, 7 Drawing Sheets

APPARATUS AND A METHOD FOR LINING AN UNDERGROUND PIPE

BACKGROUND OF THE INVENTION

1. (Field of the Invention)

The present invention relates to a novel apparatus and a method for lining an underground pipe with a liner impregnated with curable liquid resin; and in particular it relates to such a method wherein the fluid running in the pipe is utilized to facilitate the insertion of the tubular lining material in the pipe as well as the curing of the the liquid resin to thereby rationalize the lining operation.

2. (Description of the Prior Art)

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe mending comprises inserting a sufficiently long tubular flexible liner bag into the pipe to be repaired by means of a pressurized fluid, such as air and water. The tubular liner bag is made of a flexible resin-absorbent cloth material impregnated with a thermosetting (heat-curable) liquid resin, and has the outer surface covered with an impermeable plastic film.

More particularly, according to the publication, the tubular flexible liner bag is very long and closed at one end and open at the other. The tubular flexible liner bag is first flattened, then, the open end of it is made to gape wide and hooked (anchored) at one end of the defective or old pipe in a manner such that the wide-opened end of the liner bag completely and fixedly covers and closes the pipe end; a portion of the liner bag is pushed into the pipe whereby an annular pocket is made; then, a pressurized fluid is applied to the pocket portion of the tubular liner bag such that the fluid urges the tubular liner bag to enter the pipe. Since one end of the tubular liner bag is hooked at the end of the pipe, it remains there while the rest of the flexible liner bag proceeds deeper in the pipe as it is turned inside out. (Hereinafter, this manner of insertion shall be called "everting" or "eversion".) When the entire length of the tubular liner bag is everted (i.e., turned inside out) into the pipe, the everted tubular liner bag is pressed against the inner wall of the pipe by the pressurized fluid or by an inflatable pressure bag later introduced into the pipe, and the tubular flexible liner bag is hardened as the thermosetting liquid resin impregnated through the thickness of the liner bag is heated, which is effected by heating the pressurized fluid filling the tubular liner bag by means of a hot steam, etc. Thereafter the closed end of the liner bag is cut off. It is thus possible to line the inside wall of the defective or old pipe with a rigid liner without digging the ground and disassembling the pipe sections.

Now, in the case of a sewer pipe, drain water is always running in the pipe so that, when a portion of the pipe is to be repaired by lining, it is necessary to divert the drain water to bypass that portion of the pipe. The most common manner to do so consists of plugging the pipe at a location upstream to the portion to be repaired so as to stop the flow of the drain water therefrom, pumping up the stopped drain water to the surface of the ground (at a manhole), and sending it back to the pipe at a location downstream from the portion to be repaired (generally at the next manhole), thereby bypassing the portion of the pipe that is to be repaired.

(Problems the Invention seeks to solve)

However, the above-stated method of diverting the drain water to bypass the repair portion of the pipe is not always easy to adopt: for example, if a road or a bridge lies across the line along which the pipe to be repaired extends (that is, the line connecting the two manholes between which the pipe is repaired), it is virtually impossible to set up a bypass passage for the drain water.

Also, in the conventional lining method, it is necessary to heat the tubular liner bag to thereby cure the curable liquid resin impregnated through the tissue of the tubular liner bag, after everting the tubular liner bag into the pipe, so that a heating facility including boilers and tanks is required and thus the operation becomes complicated and costly. And this kind of facility including the passage for the drain water oftentimes becomes smelly and in summer unhealthy for the operators.

SUMMARY OF THE INVENTION

The present invention was made in view of the above problems and others, and it is, therefore, an object of the invention to provide a new method for lining an underground pipe which can eliminate the need for diverting the drain water from the repair portion of the pipe and dispense with the heating facility so as to make the repair operation less complicated and costly and more healthy, through utilization of the drain water to facilitate the eversion of the tubular liner in the pipe as well as the hardening of the the liquid resin.

(Means to solve the Problems)

In order to solve the above problems and others, there is proposed an apparatus and a method for lining an underground pipe. According to the proposal, an apparatus is proposed for lining a substantially horizontal underground pipe having:

a plug means for plugging the pipe at a location upstream to a manhole which is immediately upstream to that portion of the pipe which is to be lined;

a three-pronged conduit means whose first prong penetrates the plug means to open in the interior of that portion of the pipe which is upstream to the plug means and whose second prong opens in the manhole at the level of the pipe and whose third prong opens, looking downward, in the atmosphere at a substantially high level;

a vertical eversion conduit means whose lower end opens at a location immediately downstream to the end of the second prong, and whose upper end opens in the atmosphere at a substantially high level and looks upward to confront the end of the third prong such that a fluid falling from the end of the third prong is received by the upper end of the vertical eversion conduit means;

a valve means disposed to open and close the end of the second prong of the three-pronged conduit means; and a guide means provided at the lower end of the vertical eversion conduit means and disposed to cause an eversion head of a tubular liner everting down in the vertical eversion conduit means to turn orthogonally into the downstream direction at the lower end of the vertical eversion conduit means.

In a preferred embodiment, the apparatus further has a constrictor means for constricting the everted tubular liner at a location downstream to that portion of the pipe which is to be lined. This constrictor means can be an air bag capable of being inflated with compressed air. And preferably, this air bag is attached with a pressure gauge and a compressor means with which the internal pressure is controlled.

The valve means can be a flip-flop valve and it preferably is hollow and made of a heavy material such that when the valve is filled with air it floats in the drain water and when filled with water it sinks in the drain water. Also, the valve means may be a gate valve.

It is also proposed that the third prong of the three-pronged conduit means is equipped with at least one pump means for forcing the drain water in the interior of that portion of the pipe which is upstream to the plug means to flow toward the end of the third prong.

In an embodiment, the third prong of the three-pronged conduit means comprises a tank provided on the ground and one of the pump means is provided at the exit of the tank.

The guide means can be a squeezer adapted to constrict the lower end of the vertical conduit means, or a curved tube formed in the shape of a 90-degree elbow.

The invention also proposes a method for lining a substantially horizontal underground pipe comprising the steps of: (a) plugging the pipe at a location upstream to a manhole which is immediately upstream to that portion of the pipe which is to be lined; (b) providing a three-pronged passage whose first end opens in the interior of that portion of the pipe which is upstream to the location of the plugging, whose second end opens in the manhole at the level of the pipe, and whose third end opens in the atmosphere at a substantially high level and looks downward; (c) closing the second end of the three-pronged passage, thereby causing the drain water to flow from the interior of that portion of the pipe which is upstream to the location of the plugging toward the third end of the three-pronged passage; (d) allowing the drain water to fall from the down-looking third end of the three-pronged passage into an upper end of a vertical eversion conduit means provided in the manhole, thereby effecting eversion of a tubular liner into the vertical eversion conduit means; (e) guiding the tubular liner everting in the vertical eversion conduit means such that at the lower end of the vertical eversion conduit means an eversion head of the tubular liner is caused to turn orthogonally into the downstream direction; and (f) allowing the tubular liner to evert throughout that portion of the pipe which is to be lined.

In an embodiment of the inventive method, at step (c) the flow of the drain water is forced by at least one pump means.

Furthermore, at step (c) the flow of the drain water passes a tank provided on the ground, and the rate of the flow from the tank is controlled by a pump provided at the exit of the tank.

In a best mode embodiment, the inventive method further comprises a step (g) of constricting the everted tubular liner at a location downstream to that portion of the pipe which is to be lined.

(Effects of the Invention)

According to the invention, the drain water in the underground pipe is kept from flowing into that portion of the pipe which is to be lined, but is drawn up to a substantially high level and used to effect the eversion of the tubular liner into the vertical eversion conduit means, so that it is no longer necessary to divert the drain water to bypass the repair portion of the pipe. Thus, it is always possible to conduct the lining operation irrespective of the surface geography.

Also, according to the invention, the end portion of the tubular liner inserted in the pipe by eversion is constricted as well as opened, the internal pressure of the tubular liner is increased and thus the tubular liner is pressed against the inner wall of the pipe, and while this position is maintained the drain water is let to flow through the tubular liner and the thermosetting resin soaking the tubular liner is warmed and cured with the heat of the drain water; consequently, the heating apparatuses such as boilers and hot water pumps used in the conventional methods are now not necessary. As the result, the operation facility can be simplified and the operation efficiency is improved and the operation cost reduced, let alone that the sanitary situation of the repair location is improved.

The above and other objects and features of the invention will appear more fully hereinafter in the following description given in connection with the accompanying drawings and the novelty thereof pointed out in the appended claims.

(Embodiments)

Next, embodiments of the invention will be described with reference to the attached drawings.

Embodiment 1

Figure 5:
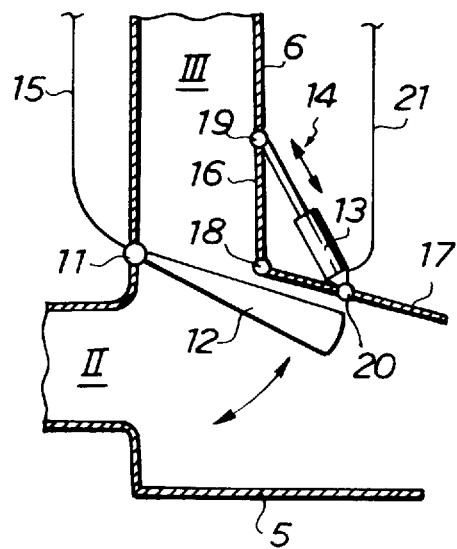
FIG. 5 is an enlarged view of a flip-flop valve and a constrictor used in the pipe lining method according to the first embodiment of the invention.
Figure 6:
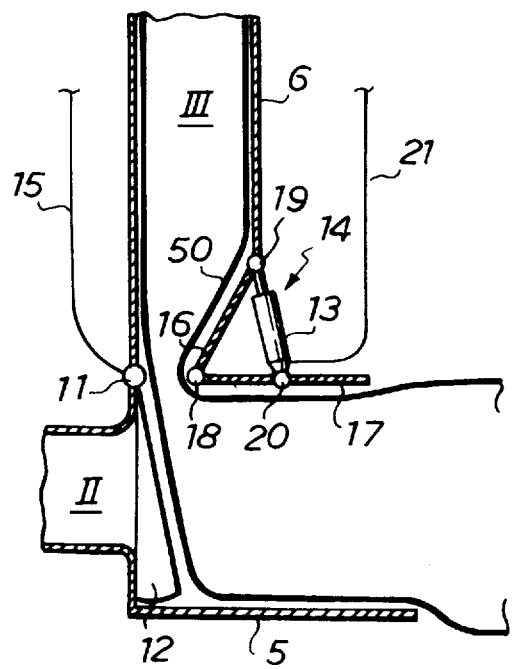
FIG. 6 is an enlarged view showing a constrictive positions of the flip-flop valve and the constrictor used in the pipe lining method according to the first embodiment of the invention.

FIGS. 1 through 4 are sectional views of a repair operation site, illustrating steps of the pipe lining method according to the invention; FIG. 5 is an enlarged view of a flip-flop valve and a constrictor; and FIG. 6 is an enlarged view showing a constrictive positions of the flip-flop valve and the constrictor.

Figure 1:
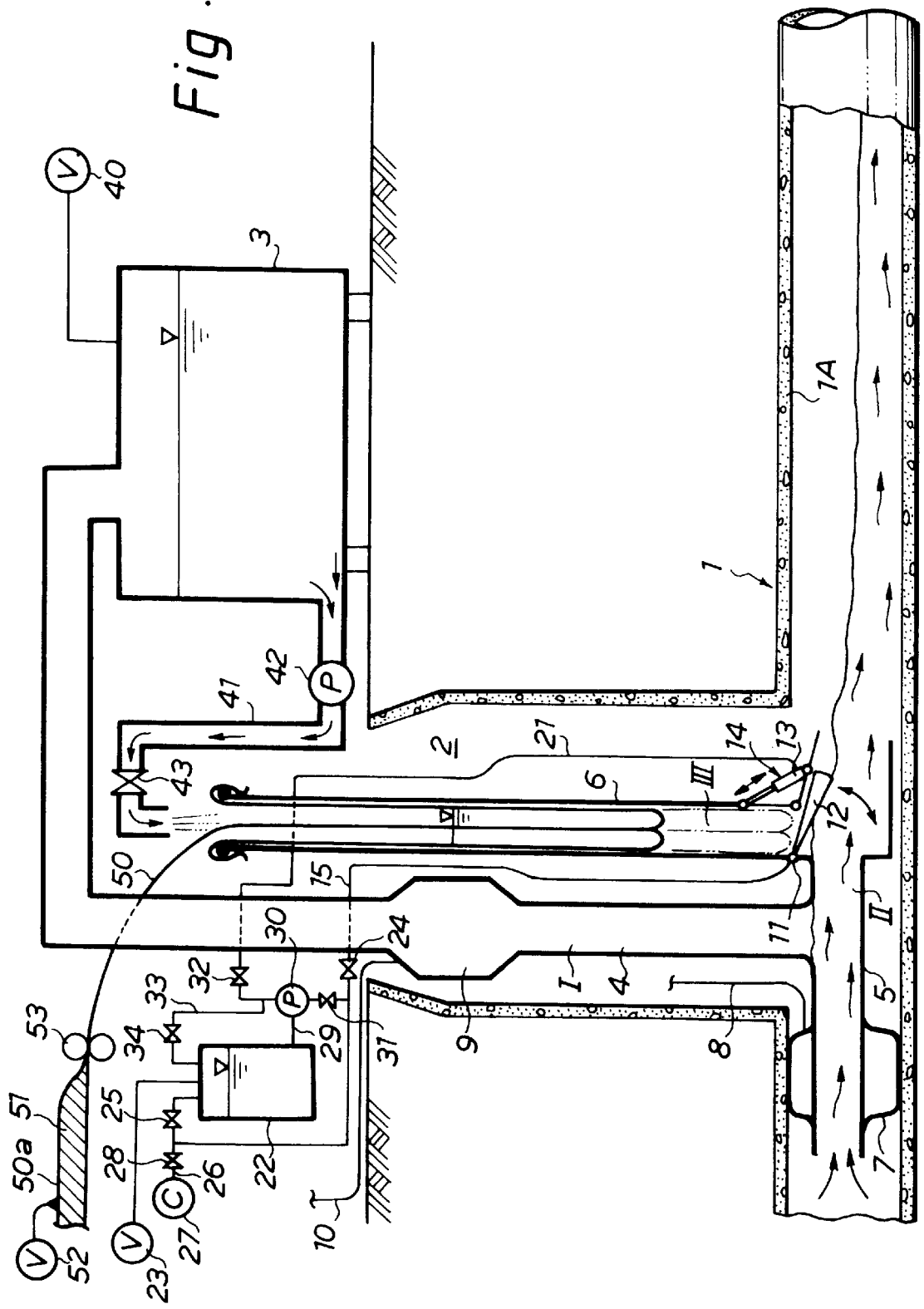
FIG. 1 is a sectional view of a repair operation site containing an underground pipe, an manhole and a set of ground facilities, illustrating a pipe lining method according to a first embodiment of the invention.

In FIG. 1, the reference numeral 1 designates an underground sewer pipe, and the reference numeral 2 designates a manhole. As can be seen, there has already been installed to extend through the manhole 2 a pipe 4, constituting a first channel I, by way of which the drain water drawn up at a location upstream to the repair portion 1A of the sewer pipe 1 (upstream to the exit port of the manhole 2) is sent to a closed tank 3 installed on the ground. Also installed in the bottom of the manhole 2 is a pipe 5, constituting a second channel II, by way of which the drain water is passed downstream across the bottom of the manhole 2. Also installed extending through the manhole 2 is an eversion guide tube 6, which is made of a flexible material and constitutes a third channel III, wherein a tubular liner is everted later. Incidentally, these pipes 4, 5 and the eversion guide tube 6 constitute an assembly which can be disassembled and assembled repeatedly; they are brought into the manhole 2 disassembled, and are assembled in it as shown in FIG. 1.

One end portion of the pipe 5 is set to penetrate through the center of an air-inflated plug 7, which is provided in the sewer pipe 1 at a location upstream to the manhole 2, and said end of the pipe 5 is disposed to open in the sewer pipe 1 on the upstream side of the air-inflated plug 7; the other end of the pipe 5 is disposed to open in the vicinity of the outlet port of the manhole 2 that leads to the repair portion 1A of the sewer pipe 1. Incidentally, the air-inflated plug 7 consists of an annular bag, which is inflatable as well as contractible, and is disposed to inflate when compressed air is supplied to it via an air hose 8 from a compressor, not shown, so as to press upon the inner wall of the sewer pipe 1 and thus plug the sewer pipe 1 and prevent the leakage of the drain water into the repair section.

The pipe 4 branches off the pipe 5 and extends upward and is turned over the ground to be connected to the closed tank 3. A hydraulically operated axial-cylinder pump 9 is provided to form a part of the pipe 4. This axial-cylinder pump 9 is driven by means of pressurized oil supplied from an hydraulic unit, not shown, by way of a hydraulic hose 10.

Incidentally, it can be said that the three channels I, II and III constitute a three-pronged conduit whose first prong penetrates the plug 7 and whose second prong opens in the bottom of the manhole and whose third prong extend upward through the manhole 2.

The eversion guide tube 6 also branches off the pipe 5 at a location downstream to the pipe 4, and extends through the manhole 2 until it opens upward above the ground.

The eversion guide tube 6 is provided with a flip-flop valve 12 hinged on a shaft 11 about which the flip-flop valve 12 freely swings to thereby open and close the second channel II (or the pipe 5), at a location where the tube 6 opens into the exit portion of the pipe 5. The eversion guide tube 6 is also provided with a constrictor 14 at the lower end portion thereof. The constrictor 14 comprises a hydraulic cylinder 13, and when the cylinder 13 contracts, the guide tube 6 is constricted in a manner such that the eversion head of the tubular liner is smoothly turned at the exit of the tube 6.

The configuration of the flip-flop valve 12 and the constrictor 14 is seen in detail in FIG. 5. The flip-flop valve 12 is hollow, and one end of a pressure hose 15 is connected to it. Incidentally the flip-flop valve 12 is made of a heavy metal such as lead and the volume of the hollow is such that when the valve 12 is filled with air it floats in the drain water and when filled with water it sinks in the drain water.

The constrictor 14 further comprises a hinge 18, which connected a link 16 constituting a part of the third channel III with a link 17 constituting a part of the second channel II in a manner such that these links 16, 17 can freely swing with respect to each other; the other end of the link 16 is connected to the end of the plunger of the hydraulic cylinder 13 via a hinge 19, which thereby connects the link 16 and the hydraulic cylinder 13 to the eversion guide tube 6. The other end of the hydraulic cylinder 13 is connected to the link 17 via a hinge 20, and a pressure hose 21 is connected to the hydraulic cylinder 13.

On the ground is also installed a small-capacity closed tank 22, as shown in FIG. 1, and a vacuum pump 23 is connected to this closed tank 22. To this closed tank 22 is also connected one end of the pressure hose 15, the other end of which is connected to the flip-flop valve 12. Valves 24 and 25 are provided across the pressure hose 15, and a compressor 27 is connected to this pipe 15 via a pipe 26 at a location between the valves 24 and 25. A valve 28 is provided across the pipe 26.

A pipe 29 leads out from a lower part of the closed tank 22, and this pipe 29 is connected to the pressure hose 15, and across this pipe 29 are provided a pump 30 and a valve 31. To this pump 30 is connected one end of the pressure hose 21, the other end of which is connected to the hydraulic cylinder 13, and a valve 32 is provided across the pressure hose 21. A pipe 33 branches off this pressure hose 21 at a location between the valve 32 and the pump 30, and this pipe 33 is connected to an upper part of the closed tank 22, and a valve 34 is provided across the pipe 33.

Figure 2:
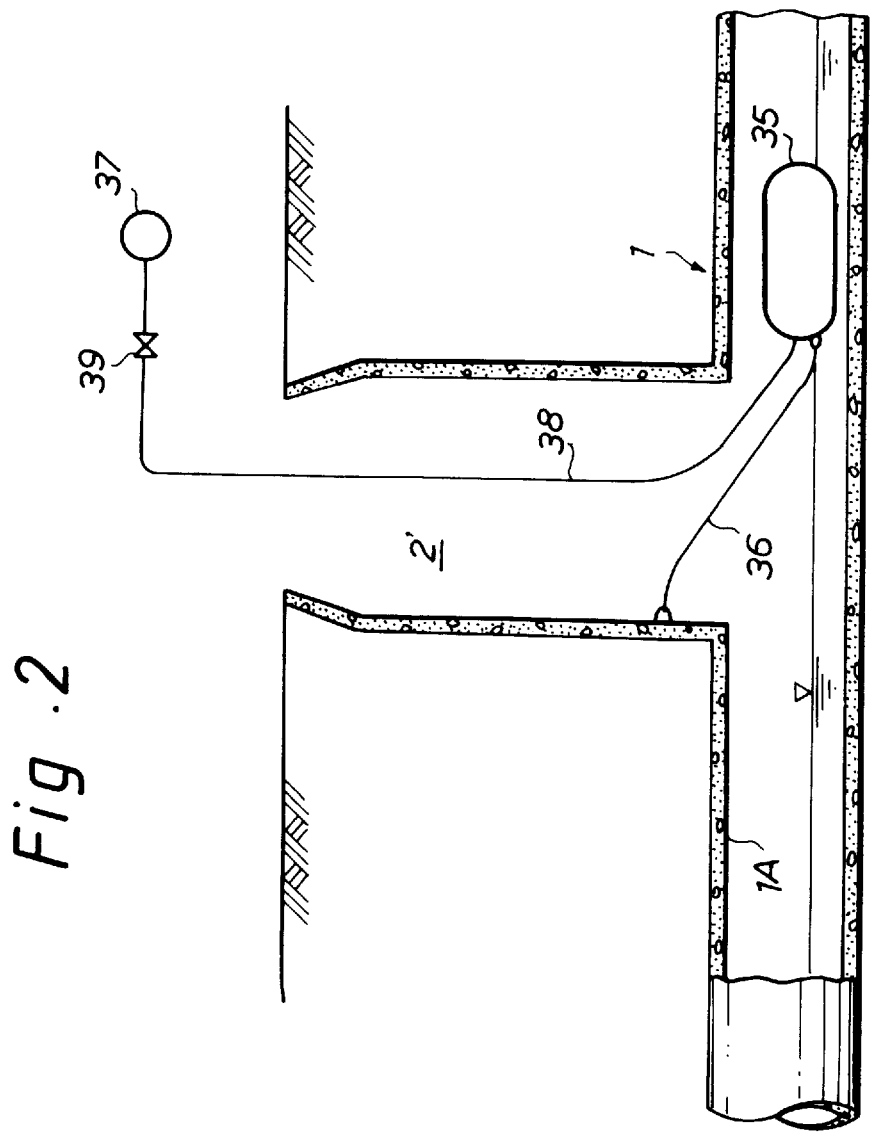
FIG. 2 is a sectional view of the repair operation site, illustrating a step of the pipe lining method according to the first embodiment of the invention.

Next, as shown in FIG. 2, an air bag 35 is provided in the sewer pipe 1 at a location downstream from the repair portion 1A (that is, at a location downstream from a neighboring manhole 2'). The air bag 35 is kept in place by means of a rope 36 fastened to the inner wall of the manhole 2', and is connected to a compressor 37 installed on the ground by means of an air hose 38. The air bag 35 is disposed to be inflated with compressed air supplied from the compressor 37. A valve 39 is provided across the air hose 38.

Referring back to FIG. 1, a vacuum pump 40 is attached to the large-capacity closed tank 3. A pipe 41 leading out from a bottom portion of the closed tank 3 extends upward and is turned and disposed to open downward over the upper opening end of the eversion guide tube 6. A pump 42 and a valve 43 are provided across the pipe 41. Incidentally, at the beginning (that is, before the lining operation is commenced), a predetermined amount of water is charged in the closed tank 3.

Next, the method for lining the pipe according to the invention will be explained with reference to the facilities described above.

First, as shown in FIG. 1, the open end of the tubular liner 50 is made to gape wide and mouth the upper open end of the eversion guide tube 6 to be fixed and anchored thereat.

The tubular liner 50 comprises a long tube made of a resin-absorbent material layer 50a, and at least the outer face of the tubular liner 50 is covered with a layer of highly-airtight plastic film. The both ends of the tubular liner 50 are not closed. The resin-absorbent material layer 50a is to be soaked with liquid thermosetting resin 51, and in this embodiment, the soaking of the resin-absorbent material layer 50a with the thermosetting resin 51 is conducted at the same time as the eversion lining is effected.

Therefore, as shown in FIG. 1, a predetermined amount of liquid thermosetting resin 51 has been injected in the hollow of the tubular liner 50, and as the tubular liner 50 is passed between a pair of rollers 53, the resin-absorbent material layer 50a is sucked at by a vacuum pump 52, whereby the thermosetting resin 51 is uniformly distributed through the layer 50a. Incidentally, the resin-absorbent material to form the layer 50a is made from a nonwoven fabric obtained by bonding or punch-pressing a mass of fiber such as of polyester, nylon, polypropylene, and acrylic resin; and the liquid thermosetting resin to wet the resin-absorbent material is selected from such resins as polyester, epoxy, and vinyl ester. The film with which at least the outer face of the tubular resin-absorbent layer 50a is covered is made of an airtight material such as polyurethane and polyethylene.

During the early stages of the lining operation, as depicted in FIG. 1, the valves 25, 31 are closed whereas the valves 24, 28 are opened, and thus as the compressor 27 is driven, compressed air is fed into the flip-flop valve 12 via the pressure hose 15, thereby making the valve 12 buoyant. Also, with the valve 34 closed and the valve 32 opened, the pump 30 is driven to supply pressurized water to the hydraulic cylinder 13 via the pressure hose 21, whereupon the hydraulic cylinder 13 is urged to maintain its extended position to fix the links 16 and 17 at the respective positions shown in FIGS. 1 and 5; hence the third channel III is straightened within the eversion guide tube 6.

With the things arranged as described above, the drain water running in the sewer pipe 1 flows downstream across the manhole 2 by way of the second channel II formed in the pipe 5, and the flip-flop valve 12 buoyant with compressed air in it floats in the stream of the drain water to take its open position.

Thereafter, as the valve 43 provided across the pipe 41 of the closed tank 3 is opened and the pump 42 is driven, the water reserved in the closed tank 3 is rushed through the pipe 41 and poured over the tubular liner 50, whereby the eversion of the tubular liner 50 is effected. Specifically, as described earlier, an end portion of the tubular liner 50 is anchored around the periphery of the upper open end portion of the eversion guide tube 6; the tubular liner 50 is partially pushed inside the tube 6, whereby an annular pocket is made; then, the water is charged into this pocket, and the water pressure (weight of the water) causes the tubular liner 50 to evert. Thus, the tubular liner 50 is everted and inserted downward in the third channel III formed by the eversion guide tube 6, as shown in FIG. 1.

As the eversion of the tubular liner 50 within the eversion guide tube 6 proceeds, and when the eversion head of the tubular liner 50 reaches the flip-flop valve 12, as drawn in two-dot chain line in FIG. 1, the valve 31 is opened and the pump 30 is driven, whereby some water in the closed tank 22 is supplied to the flip-flop valve 12 by way of the pressure hose 15; thus, the compressed air inside the flip-flop valve 12 is replaced by the water, which has a higher specific gravity.

Figure 3:
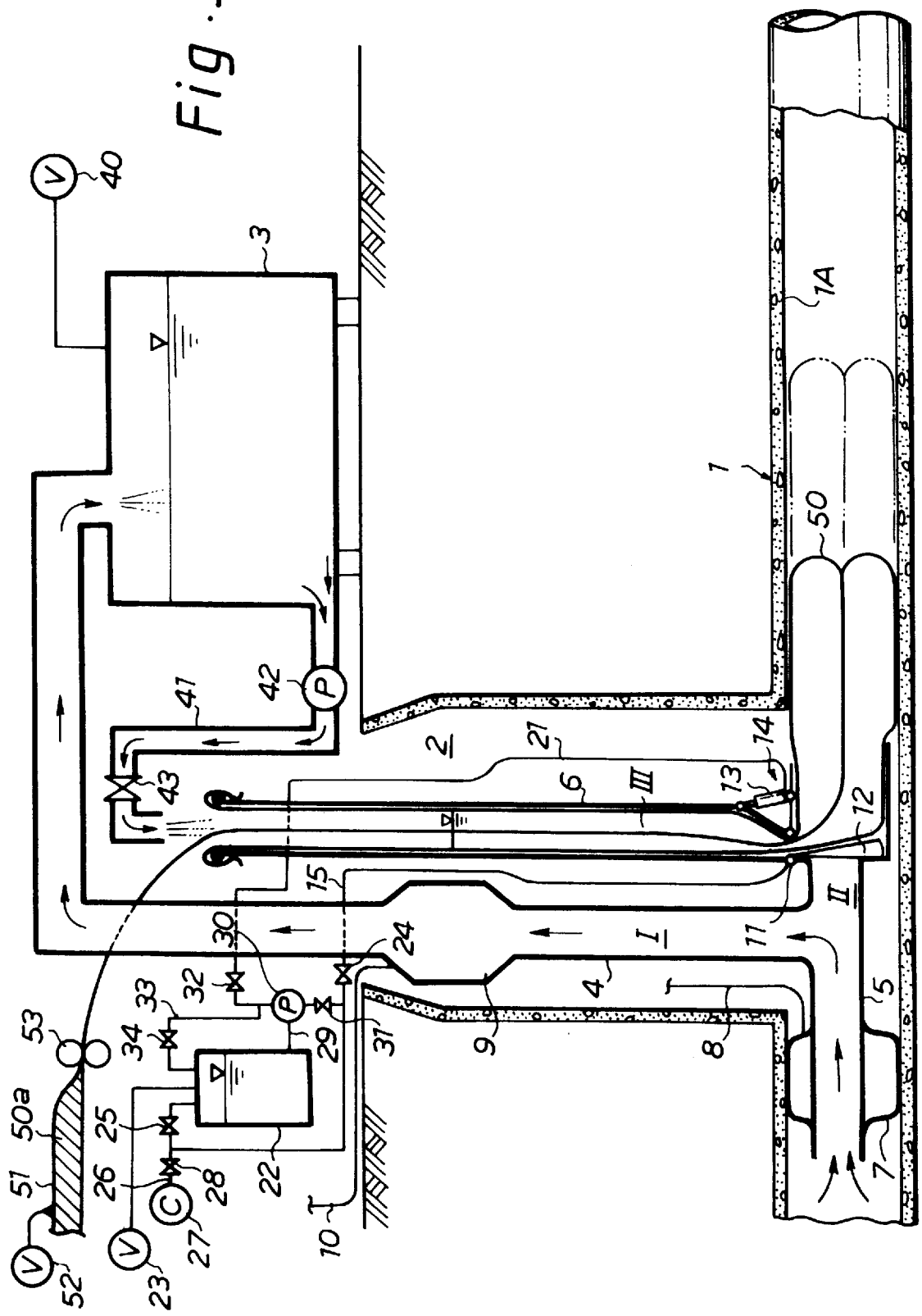
FIG. 3 is a sectional view of the repair operation site, illustrating another step of the pipe lining method according to the first embodiment of the invention.

The flip-flop valve 12 is pressed downward by the eversion head of the tubular liner 50, which is being everted downward inside the eversion guide tube 6 by means of the water pressure working upon the eversion head; thus, the flip-flop valve 12 is caused to swing about the shaft 11 until it closes the the second channel II formed by the pipe 5, as shown in FIG. 3. As described above, at this point the flip-flop valve 12 is filled with water, so that its weight is increased and the closing of the second channel II with the flip-flop valve 12 is facilitated. Meanwhile, as the water is drawn out from the closed tank 3 by means of the pump 42, a negative pressure is created within the tank 3, and thus the drain water gathered in the channel II, whose exit has been closed, is drawn into the first channel I formed by the pipe 4 and eventually poured into the closed tank 3. Incidentally, if the negative pressure created in the closed tank 3 is not strong enough to transport the drain water to the closed tank 3, the vacuum pump 40 is employed to draw air from the closed tank 3 to thereby strengthen the negative pressure in the closed tank 3, or the axial-cylinder pump 9 is driven to force the drain water to flow into the closed tank 3, or both the vacuum pump 40 and the axial-cylinder pump 9 are utilized to send the drain water to the closed tank 3.

When the drain water is sent to the closed tank 3, as described above, this drain water is in turn used to keep the tubular liner 50 everting down the eversion guide tube 6, and since the drain water charged into the tubular liner 50 does not leak outside the liner 50, the repair portion 1A of the sewer pipe 1 is not flooded with the drain water, and thus it is possible to line the repair portion 1A with the tubular liner 50 without wetting the repair portion 1A.

After the flip-flop valve 12 is closed, as described above, the valves 32 and 34 are opened, and the vacuum pump 23 is driven, whereupon the water filling the hydraulic cylinder 13 is drawn back to the closed tank 22 by way of the pressure hose 21 and the pipe 33; as the result, the hydraulic cylinder 13 contracts and displaces the links 16 and 17 in a manner such that the angle formed between these links 16, 17 is reduced to about 60 degrees, as shown in FIG. 3 and 6. This movement of the constrictor 14 entails a substantial constriction of the lower end portion of the third channel III formed by the eversion guide tube 6, and since the everted and inflated tubular liner 50, which extends through the third channel III, is similarly constricted, the turning of the tubular liner 50 becomes very easy at the constriction; thus, the eversion head of the tubular liner 50 is smoothly turned orthogonally and downstream at the exit of the tube 6 and, thereafter, the eversion head proceeds through the repair portion 1A of the sewer pipe 1.

Figure 4:
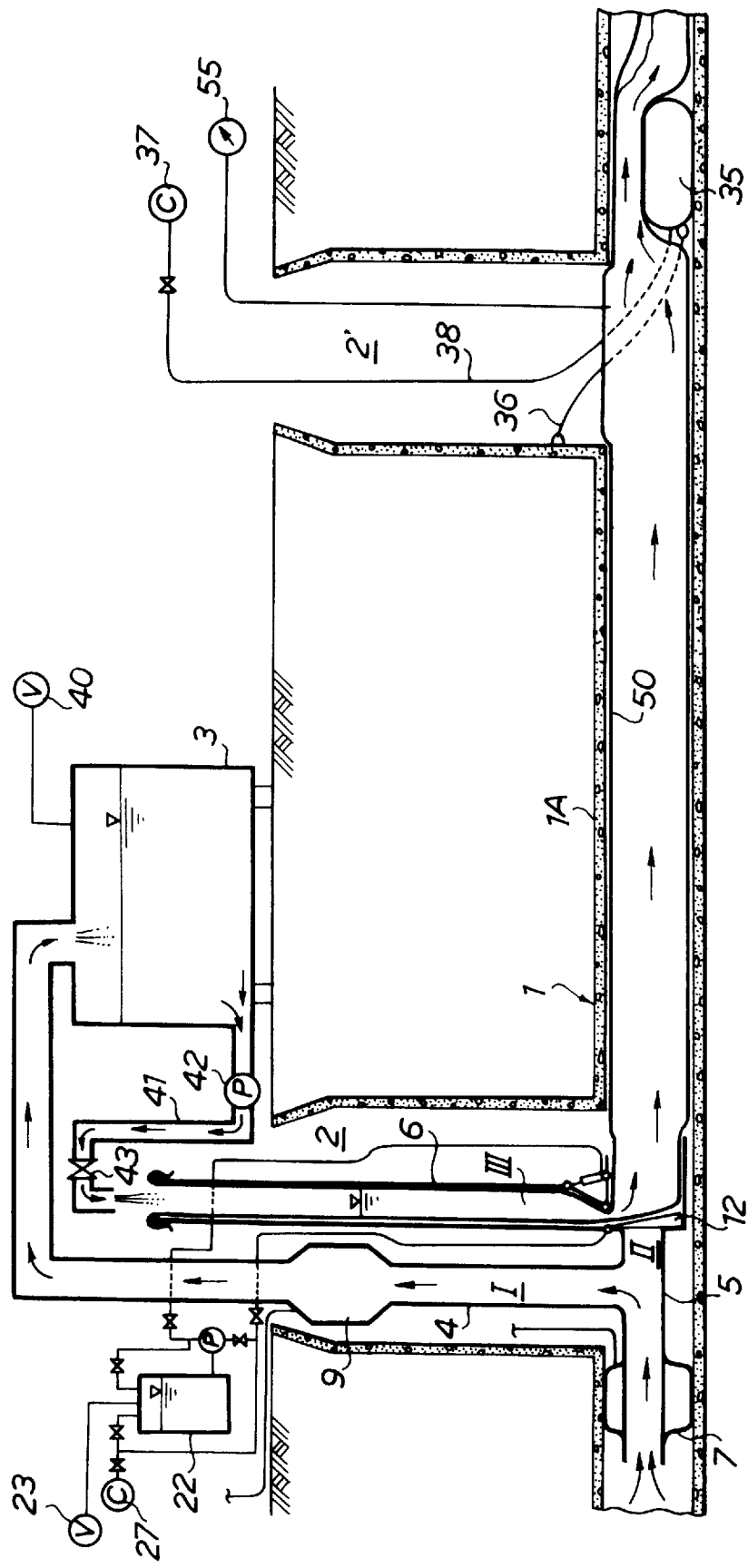
FIG. 4 is a sectional view of the repair operation site, illustrating still another step of the pipe lining method according to the first embodiment of the invention.

As the drain water drawn up into the closed tank 3 through the first channel I defined by the pipe 4 is kept charged into the pocket of the tubular liner 50, the eversion head of the tubular liner 50 is pushed by the water pressure and goes farther downstream inside the repair portion 1A of the sewer pipe 1; and when the eversion head has run over the air bag 35, as shown in FIG. 4, that portion of the tubular liner 50 which is over the air bag 35 is constricted by the air bag 35, and when the tubular liner 50 has completely been everted, the eversion head disappears and the tubular liner 50 terminates with an open end which looks downstream inside the sewer pipe 1. The open end of the tubular liner 50 lets the drain water flow out downstream; however, since that portion of the tubular liner 50 which is in the vicinity of the open end is constricted by the air bag 35, the internal pressure of the tubular liner 50 is maintained high due to the accumulated drain water, and consequently the thus swelled tubular liner 50 is pressed against the inner wall of the repair portion 1A of the sewer pipe 1. While the things are maintained as shown in FIG. 4, the drain water keeps flowing through the tubular liner 50. On this occasion, the thermosetting resin 51 soaked through the tubular liner 50 is warmed and cured with the heat of the drain water. In this way, the repair portion 1A of the sewer pipe 1 has its inner wall lined with the hardened tubular liner 50, and thus rehabilitated.

Incidentally, as shown in FIG. 4, the internal pressure of the tubular liner 50 (the pressure of the drain water flowing inside the tubular liner 50) is continuously measured by means of a pressure gauge 55 installed on the ground, and when this internal pressure becomes lower than a predetermined value (the value high enough to cause the tubular liner 50 to be pressed against the inner wall of the sewer pipe 1), the compressor 37 is driven at a higher rate to supply more compressed air to the air bag 35 so as to increase the constriction of the tubular liner 50 at the air bag 35 until the inner pressure of the tubular liner 50 turns back to the predetermined value.

In cases where the flow rate of the drain water is relatively high, the eversion velocity of the tubular liner 50 tends to be so high that the thickness of the tubular liner 50 ought to be small in order to ascertain that the soaking of the thermosetting resin 51 takes place sufficiently. In these cases, a plurality of thin tubular liners 50 are everted one after another into the sewer pipe until a desirable thickness is obtained. For example, if a liner thickness of 90 mm is required, then, a tubular liner having a thickness of 9 mm may be applied ten times; similarly thicknesses of 120 mm and 150 mm are obtained by repeating the application of 12 mm and 15 mm-thick tubular liners ten times, respectively.

As described above, according to the inventive method for lining a sewer pipe, the drain water running in the sewer pipe 1 is drawn up and utilized to effect the eversion of the tubular liner 50 into the sewer pipe 1, so that it is now not necessary to bypass the drain water from the sewer pipe 1, and also it has become possible to conduct the lining operation irrespective of the surface geography.

Furthermore, according to this inventive method for lining an underground pipe, the end portion of the tubular liner 50 inserted in the sewer pipe 1 by eversion is constricted as well as opened, the internal pressure of the tubular liner 50 is increased and thus the tubular liner 50 is pressed against the inner wall of the sewer pipe 1, and while this position is maintained the drain water is let to flow through the tubular liner 50 and the thermosetting resin 51 soaking the tubular liner 50 is warmed and cured with the heat of the drain water; consequently, the heating apparatuses such as boilers and hot water pumps used in the conventional methods are now not necessary. As the result, the operation facility can be simplified and the operation efficiency is improved and the operation cost is reduced.

Furthermore, in the above-described embodiment of the invention, since the interior of the closed tank 3 is maintained at a negative pressure, the drain water can scarcely escape from the closed tank 3 to emit stench.

Incidentally, in the above embodiment, the inventive method is applied in the operation of lining an underground sewer pipe; however, it is to be considered possible to apply the same method to any pipes of similar arrangement.

Embodiment 2

Next, a second embodiment of the invention will be explained with reference to FIGS. 7 and 8. By the way, FIGS. 7 and 8 are sectional views of a repair operation site, illustrating a pipe lining method according to the second embodiment of the invention; in these drawings those elements which have counterparts in any of FIGS. 1 through 4 are given the like reference numerals.

The lining method described in the first embodiment is effectively applicable in cases where the depth at which the sewer pipe is buried is relatively small (for example, 10 meters or less); whereas the second embodiment is preferable in cases where the depth at which the sewer pipe is buried is relatively large and, therefore, it is possible to obtain a water pressure (water head) sufficient to effect eversion of the tubular liner. Thus, with the second embodiment method, it is possible to use simpler apparatuses than the first embodiment method to effect the lining operation of the sewer pipe.

Figure 7:
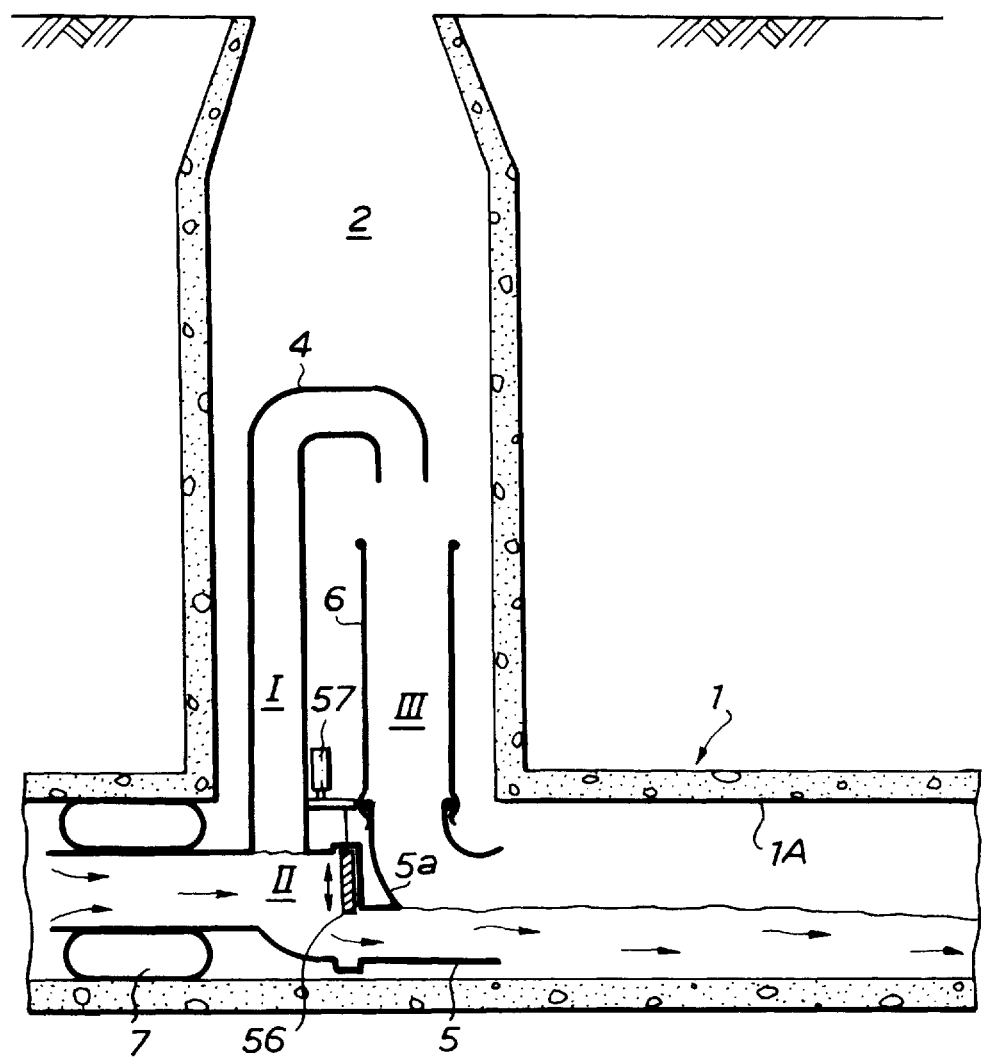
FIG. 7 is a sectional view of a repair operation site, illustrating a pipe lining method according to a second embodiment of the invention.
Figure 8:
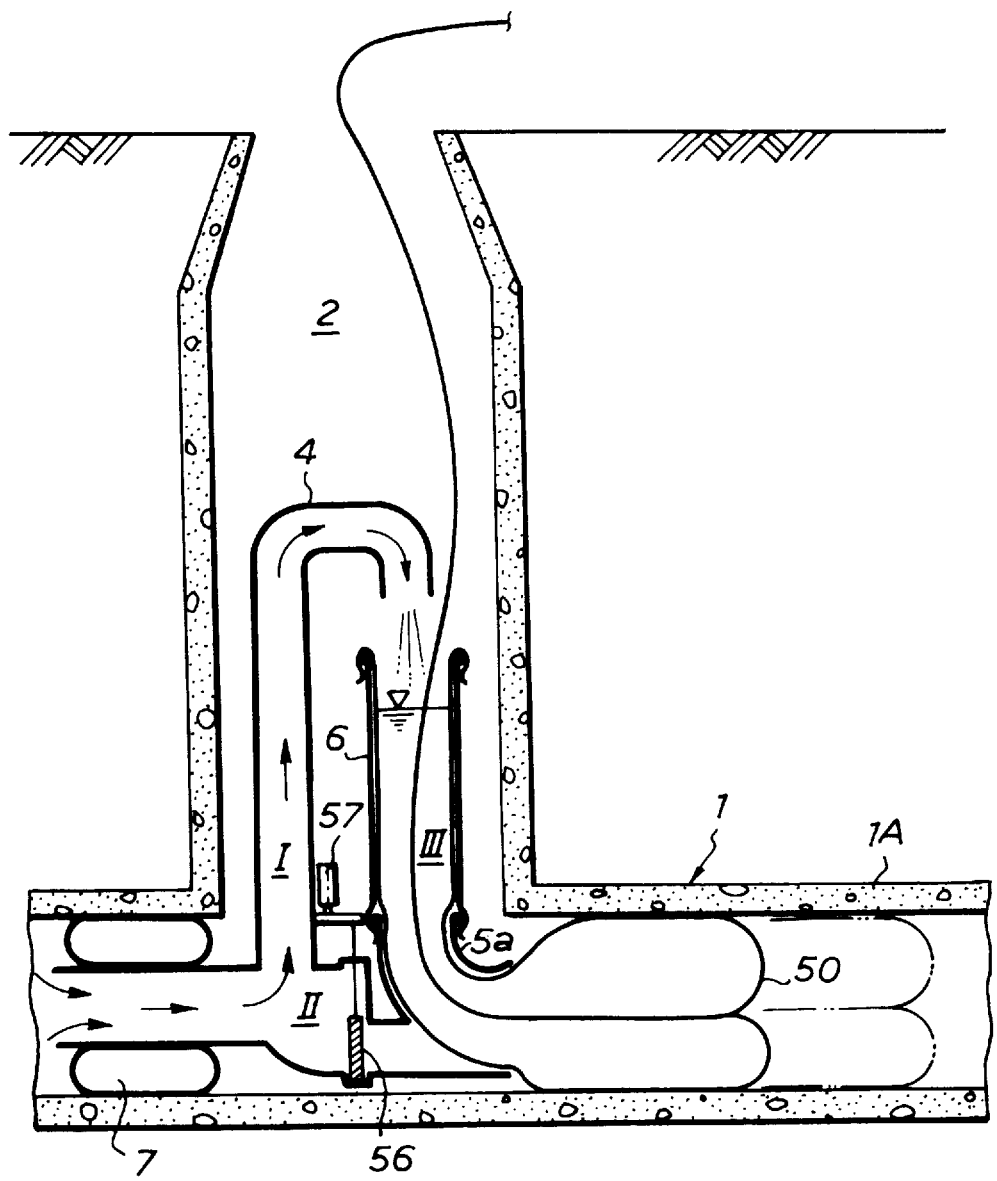
FIG. 8 is a sectional view of a repair operation site, illustrating a pipe lining method according to a second embodiment of the invention.

As shown in FIG. 7, in this second embodiment of the invention, a pipe 4 and an eversion guide tube 6 are not designed to extend above the surface of the ground, but the upper ends of these elements 4, 6 are disposed to open within a manhole 2. Specifically, the upper end portion of the pipe 4 is U-turned inside the manhole 2 and opens downward facing the upward opening of the eversion guide tube 6.

Also, a gate valve 56 for opening and closing a second channel II is provided within a pipe 5, and the movement of this valve 56 is driven by an electric motor 57. The terminal part of the pipe 5 is formed with a curved guide tube 5a, which is formed in the shape of a 90-degree elbow, and this curved guide tube 5a is disposed to open downstream within the sewer pipe 1.

Thus, before lining, the gate valve 56 is moved to its open position, as shown in FIG. 7, so that the drain water running in the sewer pipe 1 is allowed to flow downstream through the second channel II defined by the pipe 5.

Prior to the start of lining, the open end of a tubular liner 50 is made to gape wide and mouth the upper open end of the eversion guide tube 6 to be fixed and anchored thereat as shown in FIG. 8; then, by means of remote controlling, the electric motor 57 is driven to move the gate valve 56 to its close position, whereupon the second channel II is closed by the gate valve 56, as shown. Simultaneously as this, the drain water running in the sewer pipe 1 climbs up in a first channel I formed by the pipe 4, and pours into the annular pocket of the tubular liner 50. As a result, the eversion of the tubular liner 50 is effected by the pressure (weight) of the drain water from the pipe 4, like in the case of the first embodiment. Thus, the tubular liner 50 is inserted downward in the eversion guide tube 6. When the eversion head of the tubular liner 50 enters the curved guide tube 5a of the pipe 5, it is smoothly guided to turn orthogonally and downstream and, thereafter, the eversion head proceeds through the repair portion 1A of the sewer pipe 1. When the eversion head of the tubular liner 50 has run over an inflated air bag (35), not shown, provided in the sewer pipe 1 at a location downstream from the repair portion 1A and eventually disappears and becomes an open end upon completion of the eversion, that portion of the tubular liner 50 which is over the air bag is constricted, like in the first embodiment, and the internal pressure of the tubular liner 50 is maintained high due to the accumulated drain water, and consequently the thus swelled tubular liner 50 is pressed against the inner wall of the repair portion 1A of the sewer pipe 1; then, the thermosetting resin soaked through the tubular liner 50 is warmed and cured with the heat of the drain water. In this way, the repair portion 1A of the sewer pipe 1 has its inner wall lined with the hardened tubular liner 50, and thus rehabilitated.

As described above, in this embodiment also, the drain water running in the sewer pipe 1 is drawn up from the sewer pipe 1 and utilized to effect the eversion of the tubular liner pipe 50 into the eversion guide tube 6 and the sewer pipe 1, and the thermosetting resin soaking the tubular liner 50 is warmed and cured with the heat of the drain water running on the tubular liner 50 everted inside the sewer pipe 1; as the result, all of the effects as obtained in the first embodiment of the invention are obtained in this second embodiment also, and moreover, the closed tank and the various pumps are no longer required so that it is possible to conduct the lining of the sewer pipe 1 with further simplified set of facilities at a high efficiency and low cost.

Furthermore, in the second embodiment, since the height of the pipe 4 is smaller than the depth of the manhole 2, the upper end portion of the pipe 4 does not extend above the surface of the ground, so that the drain water does not flow over the ground surface to contaminate it.

While the invention has been described in its preferred embodiments, it is to be understood that modifications will occur to those skilled in the art without departing from the spirit of the invention. The scope of the invention is therefore to be determined solely by the appended claims.

What is claimed is:

1. An apparatus for lining a substantially horizontal underground pipe comprising:

a plug means for plugging the pipe at a location upstream to a manhole which is immediately upstream to that portion of the pipe which is to be lined;

a three-pronged conduit having a first prong which penetrates said plug means to open in the interior of that portion of the pipe which is upstream to the plug means, a second prong which opens in the manhole at the level of the pipe and a third prong which opens looking downward in the atmosphere at a substantially high level;

a vertical eversion conduit having a lower end which opens at a location immediately downstream to the end of said second prong, and an upper end which opens in the atmosphere at a substantially high level and looks upward to confront the end of said third prong such that a fluid falling from the end of said third prong is received by said upper end of the vertical eversion conduit;

a valve means disposed to open and close the end of said second prong of the three-pronged conduit; and a guide means provided at the lower end of the vertical eversion conduit and disposed to cause an eversion head of a tubular liner everting down in the vertical eversion conduit to turn orthogonally into the downstream direction at the lower end of the vertical eversion conduit means.

2. The apparatus as recited in claim 1 further comprising a constrictor means for constricting the everted tubular liner at a location downstream to that portion of the pipe which is to be lined.

3. The apparatus as recited in claim 2, wherein said constrictor means is an air bag capable of being inflated with compressed air.

4. The apparatus as recited in claim 3, wherein said air bag is attached with a pressure gauge and a compressor means with which the internal pressure of the air bag is controlled.

5. The apparatus as recited in claim 1, wherein said valve means is a flip-flop valve.

6. The apparatus as recited in claim 5, wherein said flip-flop valve is hollow and made of a heavy material such that when the valve is filled with air it floats in the drain water and when filled with water it sinks in the drain water.

7. The apparatus as recited in claim 1, wherein said valve means is a gate valve.

8. The apparatus as recited in claim 1, wherein said third prong of the three-pronged conduit is equipped with at least one pump means for forcing the drain water in the interior of that portion of the pipe which is upstream to the plug means to flow toward the end of said third prong.

9. The apparatus as recited in claim 8, wherein said third prong of the three-pronged conduit comprises a tank provided on the ground and one of said at least one pump means is provided at the exit of the tank.

10. The apparatus as recited in claim 1, wherein said guide means is a squeezer adapted to constrict the lower end of the vertical eversion conduit means.

11. The apparatus as recited in claim 1, wherein said guide means is a curved tube formed in the shape of a 90-degree elbow.

12. A method for lining a substantially horizontal underground pipe comprising steps of:

(a) plugging the pipe at a location upstream to a manhole which is immediately upstream to that portion of the pipe which is to be lined;

(b) providing a three-pronged passage whose first end opens in the interior of that portion of the pipe which is upstream to the location of the plugging, whose second end opens in the manhole at the level of the pipe, and whose third end opens in the atmosphere at a substantially high level and looks downward;

(c) closing said second end of the three-pronged passage, thereby causing the drain water to flow from the interior of that portion of the pipe which is upstream to the location of the plugging toward the third end of the three-pronged passage;

(d) allowing the drain water to fall from said downlooking third end of the three-pronged passage into an upper end of a vertical eversion conduit means provided in the manhole, thereby effecting eversion of a tubular liner into said vertical eversion conduit means;

(e) guiding the tubular liner everting in the vertical eversion conduit means such that at the lower end of the vertical eversion conduit means an eversion head of the tubular liner is caused to turn orthogonally into the downstream direction; and (f) allowing the tubular liner to evert throughout that portion of the pipe which is to be lined.

13. The method as recited in claim 12, wherein step (c) further comprises the step of forcing the flow of drain water by at least one pump means.

14. The method as recited in claim 13, wherein at step (c) the flow of the drain water passes a tank provided on the ground, further comprising the step of controlling the rate of the flow from the tank by a pump provided at the exit of the tank.

15. The method as recited in claim 12, further comprising a step (g) of constricting the everted tubular liner at a location downstream to that portion of the pipe which is to be lined.

16. The method as recited in claim 12, further comprising a step (g) of everting a plurality of thin tubular liners one after another into the sewer pipe until a desirable thickness is obtained.

* * * * *